(12) United States Patent
Kocha (10) Patent No.: US 7,887,963 B2
(45) Date of Patent: Feb. 15, 2011

(54) MITIGATING FUEL CELL START UP/SHUT DOWN DEGRADATION

(75) Inventor: Shyam Kocha, West Henrietta, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1172 days.

(21) Appl. No.: 11/113,462

(22) Filed: Apr. 25, 2005

(65) Prior Publication Data

US 2006/0240293 A1 Oct. 26, 2006

(51) Int. Cl.
H01M 8/00 (2006.01)
H01M 8/04 (2006.01)
(52) U.S. Cl. .............. 429/429; 429/428; 429/434; 429/439
(58) Field of Classification Search ........... 429/12–46
See application file for complete search history.

(56) References Cited

U.S. PATENT DOCUMENTS 4,537,839 A * 8/1985 Cameron .............. 429/20
2001/0028967 A1 * 10/2001 Roberts et al. .............. 429/13
2003/0186093 A1 * 10/2003 St-Pierre et al. ............ 429/13
2004/0033398 A1 * 2/2004 Kearl et al. ................ 429/22
2005/0031922 A1 * 2/2005 Clingerman et al. ........ 429/22

OTHER PUBLICATIONS

International Search Report dated Aug. 1, 2007 for Appln No. PCT/US06/11736 filed Mar. 31, 2006 corresponding to this application.

* cited by examiner

*Primary Examiner*—Dah-Wei D Yuan
*Assistant Examiner*—Steven Scully
(74) *Attorney, Agent, or Firm*—Dinsmore & Shohl LLP (57) ABSTRACT

A method of operating an electrochemical conversion assembly is provided where a shut down sequence is introduced where a substantially dry gas is driven through the cathode flow field. The dry gas is supplied for an amount of time sufficient to reduce the water content of the proton exchange membrane to a level sufficient to suppress corrosion and catalyst dissolution in the membrane electrode assembly. Additional embodiments are disclosed.

24 Claims, 6 Drawing Sheets

MITIGATING FUEL CELL START UP/SHUT DOWN DEGRADATION

BACKGROUND OF THE INVENTION

The present invention relates to electrochemical conversion cells, commonly referred to as fuel cells, which produce electrical energy by processing first and second reactants. For example, electrical energy can be generated in a fuel cell through the reduction of an oxygen-containing gas and the oxidation of a hydrogenous gas. By way of illustration and not limitation, a typical cell comprises a membrane electrode assembly positioned between a pair of flow fields accommodating respective ones of the reactants. More specifically, a cathode flowfield plate and an anode flowfield plate can be positioned on opposite sides of the membrane electrode assembly. The voltage provided by a single cell unit is typically too small for useful application so it is common to arrange a plurality of cells in a conductively coupled "stack" to increase the electrical output of the electrochemical conversion assembly.

BRIEF SUMMARY OF THE INVENTION

The present invention is directed to mitigating start-up/shut down losses in electrochemical conversion assemblies employing humidified membrane electrode assemblies. In accordance with one embodiment of the present invention, a method of operating an electrochemical conversion assembly is provided. By way of background, the conversion assembly generally comprises a membrane electrode assembly, an anode flowfield, and a cathode flowfield. The membrane electrode assembly in turn comprises a proton exchange membrane separating an anode and cathode. The membrane electrode assembly generally comprises, among other things, a catalyst supported by a high surface area support material and is characterized by enhanced proton conductivity under wet conditions.

According to the method, a start up sequence is initiated by driving a hydrogenous front through the anode flow field. The support material and the electrode catalyst of the membrane electrode assembly are subject to corrosion and catalyst dissolution as a result of relatively high voltages developed on the cathode of the membrane electrode assembly under the influence of the hydrogen front displacing air in the anode flow field. To mitigate this degradation, a shut down sequence is introduced where a substantially dry gas is driven through the cathode flow field. The dry gas is supplied for an amount of time sufficient to reduce the water content of the proton exchange membrane to a level sufficient to suppress the catalyst dissolution and the corrosion in the membrane electrode assembly.

In accordance with another embodiment of the present invention, a substantially dry gas is driven through the cathode flow field for an amount of time sufficient to reduce the water content $\lambda$ of the proton exchange membrane to below about 5, where $\lambda$ corresponds to an $H_2O/SO_3H$ ratio in the membrane.

In accordance with additional embodiments of the present invention, a substantially dry gas is driven through the anode flow field or the anode and cathode flow fields to reduce the water content of the proton exchange membrane.

In accordance with yet another embodiment of the present invention, an electrochemical conversion assembly is provided with an assembly controller programmed to initiate a shut down sequence where a substantially dry gas from the dry gas source is driven through a flow field of the assembly to reduce the water content of the proton exchange membrane to a suitable level.

Accordingly, it is an object of the present invention to mitigate start-up/shut down losses in electrochemical conversion assemblies employing humidified membrane electrode assemblies. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
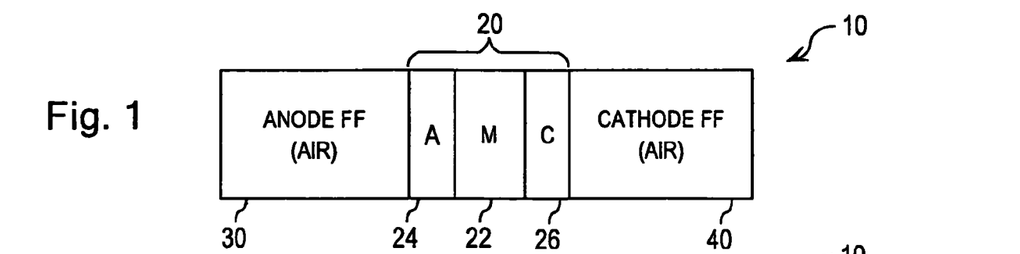
FIGS. 1-10 illustrate an electrochemical conversion assembly operational sequence according to the present invention.

Referring initially to FIG. 1, an electrochemical conversion assembly 10 is illustrated schematically. The assembly 10 comprises a membrane electrode assembly 20 collectively including a proton exchange membrane 22 separating an anode 24 and cathode 26. The electrochemical conversion assembly 10 further comprises an anode flowfield 30 and a cathode flowfield 40. It is noted that many aspects of the specific structure, configuration, design, and operation of the electrochemical conversion assembly of the present invention are not discussed here because they can be gleaned from the existing extensive collection of teachings on the subject of fuel cells. On a general level, it suffices to note that the assembly 10 is configured to produce electrical energy by processing first and second reactants passing through the respective flow fields 30, 40. For example, electrical energy can be generated in the assembly through the oxidation of an oxygen-containing gas and the reduction of a hydrogenous gas. For the purpose of describing and defining the present invention, it is noted that a hydrogenous gas can be substantially pure $H_2$, a gas mixture including $H_2$, or a gaseous compound formed from hydrogen and one or more additional elements. For example, hydrogenous gases include, but are not limited to, hydrogen, methane, reformed fuels, and reformed natural gases.

The anode 24 and cathode 26 of the membrane electrode assembly 20 are constructed of a relatively high surface area material supporting one or more catalysts, such as platinum, platinum alloys, such as PtCo, PtCr, PtV, PtTi, PtIr, PtNi, PtCoCr, PtCoIr, PtRhFe, and the like. For example, the high surface area material may comprise a carbonaceous material. For the purpose of defining and describing the present invention, it is noted that a carbonaceous material can be substantially pure carbon such as a carbon black or graphite, a mixture including carbon, a compound including carbon and one or more additional elements, or a matrix supporting one of these types of carbon materials. More specifically, some supports on which Pt and Pt-alloy catalysts can be dispersed on include: Vulcan™ (240 m2/g), Ketjen Black™ (800 m2/g), Black Pearls™ (2000 m2/g), graphitized Vulcan™ (80 m2/g), or any other suitable organic or inorganic supports. It is also noted that reference herein to catalyst support materials of "relatively high" surface area should be taken as referring to the components of the assembly in general. Accordingly, a relatively high surface area support material will have a surface area that is generally higher than that of many of the components of the assembly. For example, and not by way of limitation, surface areas generally from about 5 m$^2$/g to about 2000 m$^2$/g, and above, can be taken as "relatively high" surface area materials. Typically, these materials are susceptible to corrosion at high potentials.

The proton exchange membrane 22 comprises a material that encourages the exchange of protons across the assembly 20 and is typically characterized by enhanced proton conductivity under wet conditions. It is contemplated that any suitable proton exchange membrane may be utilized within the scope of the present invention. For example, and not by way of limitation, polymer electrolyte membranes are widely used in electrochemical conversion cells because they conduct protons efficiently and possess low fuel crossover properties—defining a suitable partition between reactant supplies. They are also robust enough to be assembled into a fuel cell stack and have relatively long life. One of the most common types of polymer electrolyte membranes is NAFION®, a perfluorosulfonate ionomer membrane material available from DuPont that is widely used in electrochemical conversion cells where the first reactant $R_1$ is a hydrogenous fuel source and the second reactant $R_2$ comprises oxygen or air.

Figure 2:
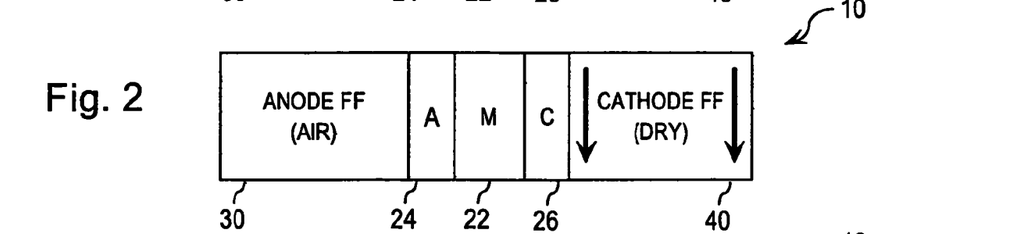
Figure 3:
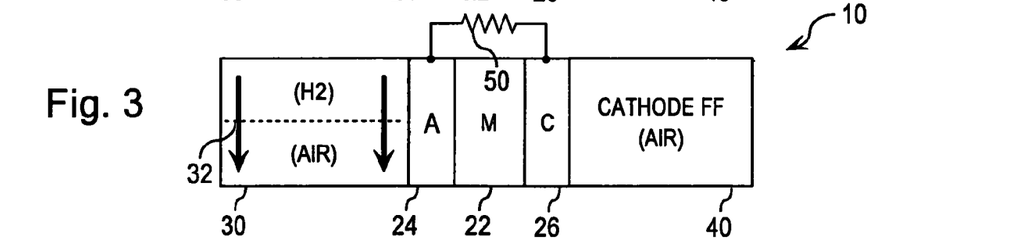

Referring to FIG. 2, prior to start-up, the anode flow field 30 of an electrochemical conversion assembly 10 is filled primarily with air that has either been intentionally introduced into the anode flow field 30 or has diffused into the anode flow field 30 across the proton exchange membrane 22 from the cathode flow field 40. It is noted that there are many sources of air diffusion. For example, air may diffuse into the anode flow field 30 directly from the cathode flow field 40, from exit valves or other system plumbing, or from the atmosphere via flowfield seals. In any event, referring to FIG. 3, a start up sequence according to the present invention is initiated where a hydrogenous front 32 is driven through the anode flow field 30, forming an interface with the air in the flow field 30 and generating relatively high voltages on the cathode 26 of the membrane electrode assembly 20. The support material and the catalysts of the membrane electrode assembly 20 are prone to corrosion and catalyst dissolution as a result of these relatively high voltages. A shorting resistor 50 is also illustrated schematically across the membrane electrode assembly 20 in FIG. 3 as it can be utilized to allow leakage current to flow to the electrode of lower potential and/or consume oxygen on the cathode side of the cell. In addition, the shorting resistor 50 allows for reduction of the cell potential to a relatively low level, e.g., about 0.2 volts, during start-up/shut-down cycling and stabilizes the assembly 10 during start-up and periods of extended inactivity.

Figure 4:
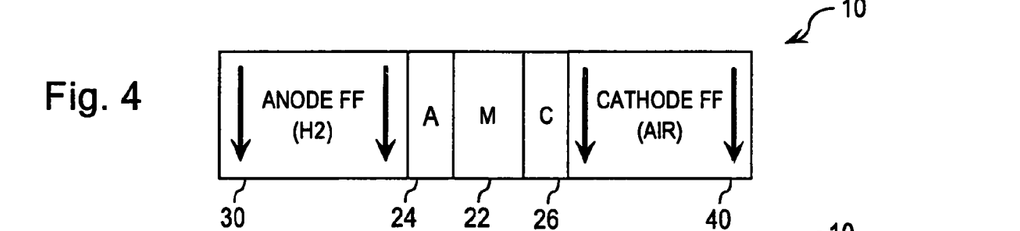

By way of illustration and not limitation, typical proton exchange membranes operating at partial or full loads under optimum conditions are humidified to a significant extent—typically in excess of about 50% RH. A number of mechanisms may be utilized to humidify the membrane. For example, the oxygen-containing gas introduced into the cathode flow field 40 can be humidified to a relative humidity in excess of about 80% to facilitate optimum wetting of the proton exchange membrane 22. Referring to FIG. 4, the present inventors have recognized that although the operation of the electrochemical conversion assembly 10 can be optimized by driving a hydrogenous gas through the anode flow field 30 and an oxygen-containing gas through the cathode flow field 40 under wet conditions, certain advantages can be achieved by removing water from the proton exchange membrane 22.

Figure 5:
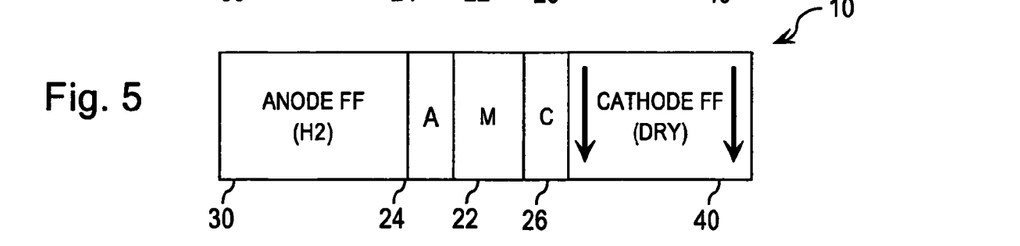
Figure 6:
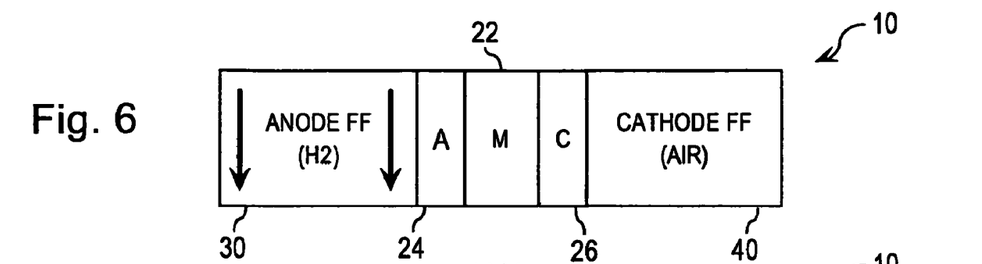
Figure 7:
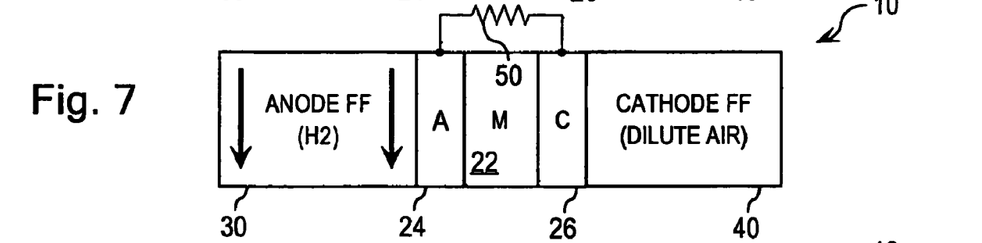

Specifically, referring to FIG. 5, the aforementioned degradation of the support material and catalysts of the proton exchange membrane 22 can be mitigated by initiating a shut down sequence where a substantially dry gas is driven through the cathode flow field 40 to initiate a transition of the conversion assembly 10 from relatively high load operating conditions. Typically, as is represented schematically in FIG. 5, the transition from the relatively high load operating conditions will be accompanied by a substantial decrease in the supply of the hydrogenous gas through the anode flow field.

In accordance with one embodiment of the present invention, the supply of hydrogenous gas to the anode flow field 30 is almost completely shut off and the dry gas is driven through the cathode flow field 40 for an amount of time sufficient to reduce the water content of the proton exchange membrane 22 to a level sufficient to suppress the aforementioned catalyst dissolution and corrosion in the membrane electrode assembly 20. For example, and not by way of limitation, it is noted that a relatively low humidity air flow (RH below about 40%) would constitute a suitable dry gas for use with the present invention.

In accordance with another embodiment of the present invention, the aforementioned catalyst dissolution and corrosion in the membrane electrode assembly 20 can be mitigated by driving the substantially dry gas through the cathode flow field 40 for an amount of time sufficient to reduce the water content λ of the proton exchange membrane to below about 5, where λ corresponds to the molar ratio $H_2O/SO_3H$ in the membrane. As a further alternative, those practicing the present invention may elect to drive the substantially dry gas through the cathode flow field 40 during the shut down sequence for an amount of time sufficient to reduce the water content of the proton exchange membrane 22 to below about 50% equivalent RH, where equivalent RH corresponds to the relative humidity of a gas in equilibrium with the membrane 22.

It is noted that the high frequency (about 1 kHz) electrical resistivity of the proton exchange membrane 22 can be monitored during the shut down sequence of the present invention. Since the electrical resistivity provides a direct correlation to the water content of the membrane 22, the supply of dry gas to the cathode flow field 40 can be interrupted when the resistivity reaches a predetermined value, i.e., when it is deemed that sufficient drying out of the membrane has been achieved. As an alternative, it is noted that the relative humidity of a cathode outlet gas can be monitored during the shut down sequence to provide an indication of membrane dryness. It is contemplated that the duration of the drying purge can be determined for a given stack configuration and applied to that configuration without the need for independent or on-going measurements for individual systems. It is expected that those practicing the present invention will desire to restrict the drying time to below a few minutes to minimize power consumption. Significant factors affecting drying time include temperature and drying purge flow rate and can be tailored for specific applications according to the design and operating requirements at hand.

FIGS. 6-10 further illustrate the shut down sequence according to further aspects of the present invention. Specifically, referring to FIGS. 6 and 7, it is noted that upon completion of the aforementioned drying step, the supply of gas to the cathode flow field 40 is interrupted. Subsequently, or simultaneously, a shorting resistor 50 is provided across the membrane electrode assembly 20 and a hydrogenous gas is driven through the anode flow field 30 to dilute the oxygen content of the gas in the cathode flow field 40 and reduce the voltage generated by the assembly 10. It is noted that, in this context, a relatively small flow of hydrogenous gas is maintained to minimize emission of hydrogen to the atmosphere.

Figure 8:
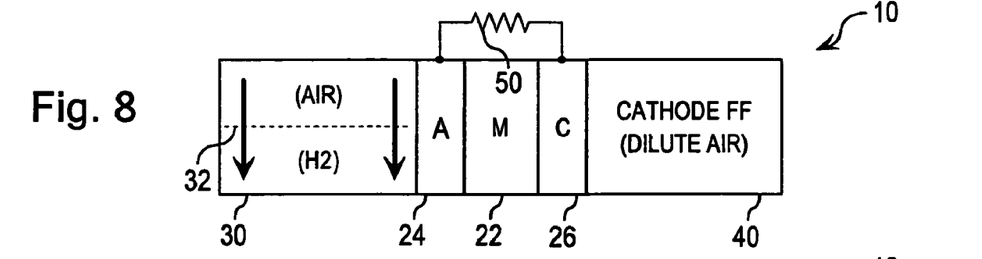
Figure 9:
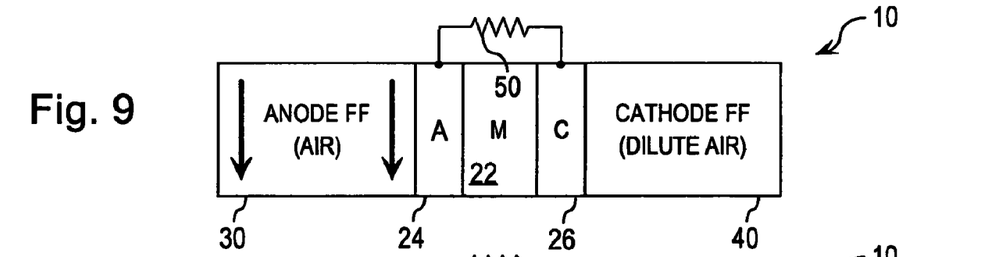

Referring to FIG. 8, once the gas in the cathode flow field 40 has been depleted of oxygen to a suitable level, shut down is further facilitated by introducing an oxygen containing gas, e.g., air into the anode flow field 30. It is noted that the resulting air/air interface across the membrane electrode assembly 20 could also be achieved passively by allowing air to diffuse into the anode flow field 30 from the cathode flow field 40. However, it is contemplated that the controlled transition of the electrochemical conversion assembly 10 to an air/air interface during shut down is likely to provide for more reliable and repeatable transition to the air/air state illustrated in FIG. 9. It is also noted that the controlled introduction of air into the anode flow field, as illustrated in FIG. 8, also provides an additional alternative for introducing a drying gas into the electrochemical conversion assembly 10 during shut down. Indeed, it is contemplated that the aforementioned mitigation of catalyst dissolution and corrosion can be achieved by introducing the drying gas during the operational sequence illustrated in FIG. 8 alone, or in combination with the drying step of FIG. 5. It is contemplated that a cell voltage of about 0.2 volts or less will be sufficient to yield sufficient oxygen consumption.

Figure 10:
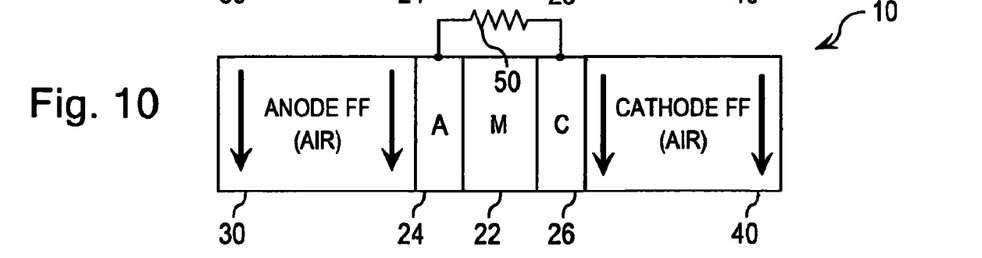

Similarly, referring to FIG. 10, further drying of the proton exchange membrane 22 may be affected as an oxygen containing gas, such as air, is introduced into the anode and cathode flow fields 30, 40 to bring the electrochemical conversion assembly into a stack equilibrium storage condition. As is illustrated in FIG. 10 the stack equilibrium condition is characterized by the presence of common gases, e.g, air, in both the anode flow field 30 and the cathode flow field.

The operational sequence of FIG. 2 provides a further opportunity for removing water from the proton exchange membrane 22. Specifically, the start up sequence illustrated in FIG. 2 may be characterized by the passage of a substantially dry gas through the cathode flow field 40 following the shut down sequence and prior to introduction of the hydrogenous front in the anode flow field 30. It is contemplated that the drying affected during the operational sequence of FIGS. 2 and 10 may be sufficient to mitigate membrane electrode assembly degradation alone, or in combination with any of the aforementioned drying steps.

The temperature of the membrane electrode assembly 20 can also be considered when attempting to mitigate catalyst dissolution and corrosion in the membrane electrode assembly 20. Specifically, the present inventors have recognized that catalyst dissolution and corrosion in the membrane electrode assembly 20 can be suppressed through appropriate cooling of the membrane electrode assembly 20 during the shut down sequence. The cooling can be affected in a variety of ways. For example, and not by way of limitation, cooling can be affected through the operation of an assembly coolant pump, the introduction of a relatively cool gas into one or both of the flow fields, or combinations of these and similar schemes. In specific embodiments of the present invention, the cooling is tailored to be sufficient to reduce the temperature of the membrane electrode assembly 20 to below about 50° C. or, in some cases, to about 25° C.

Figure 11:
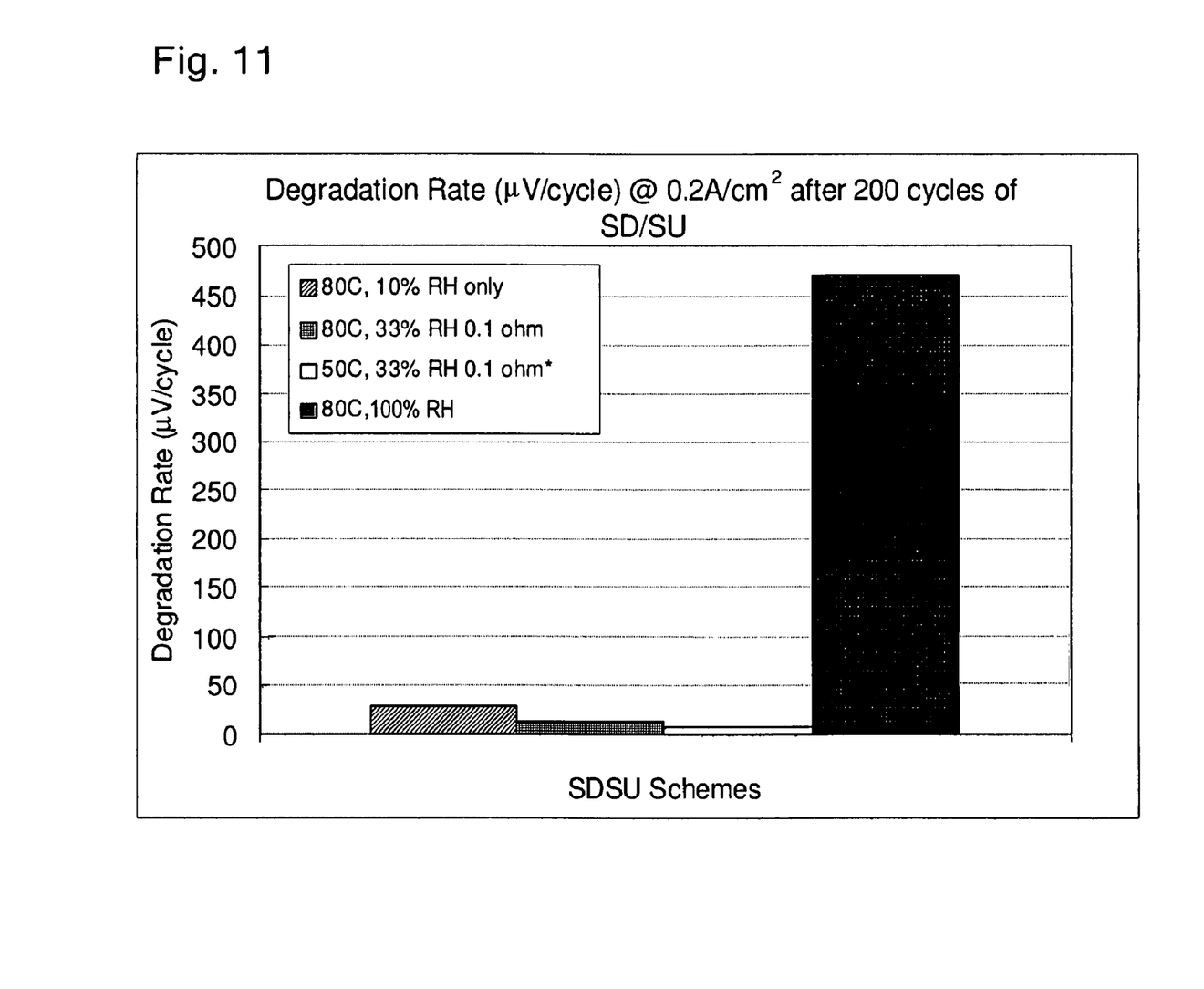
FIGS. 11 and 12 illustrate comparative degradation rates under cycling at specific temperature and RH values.
Figure 12:
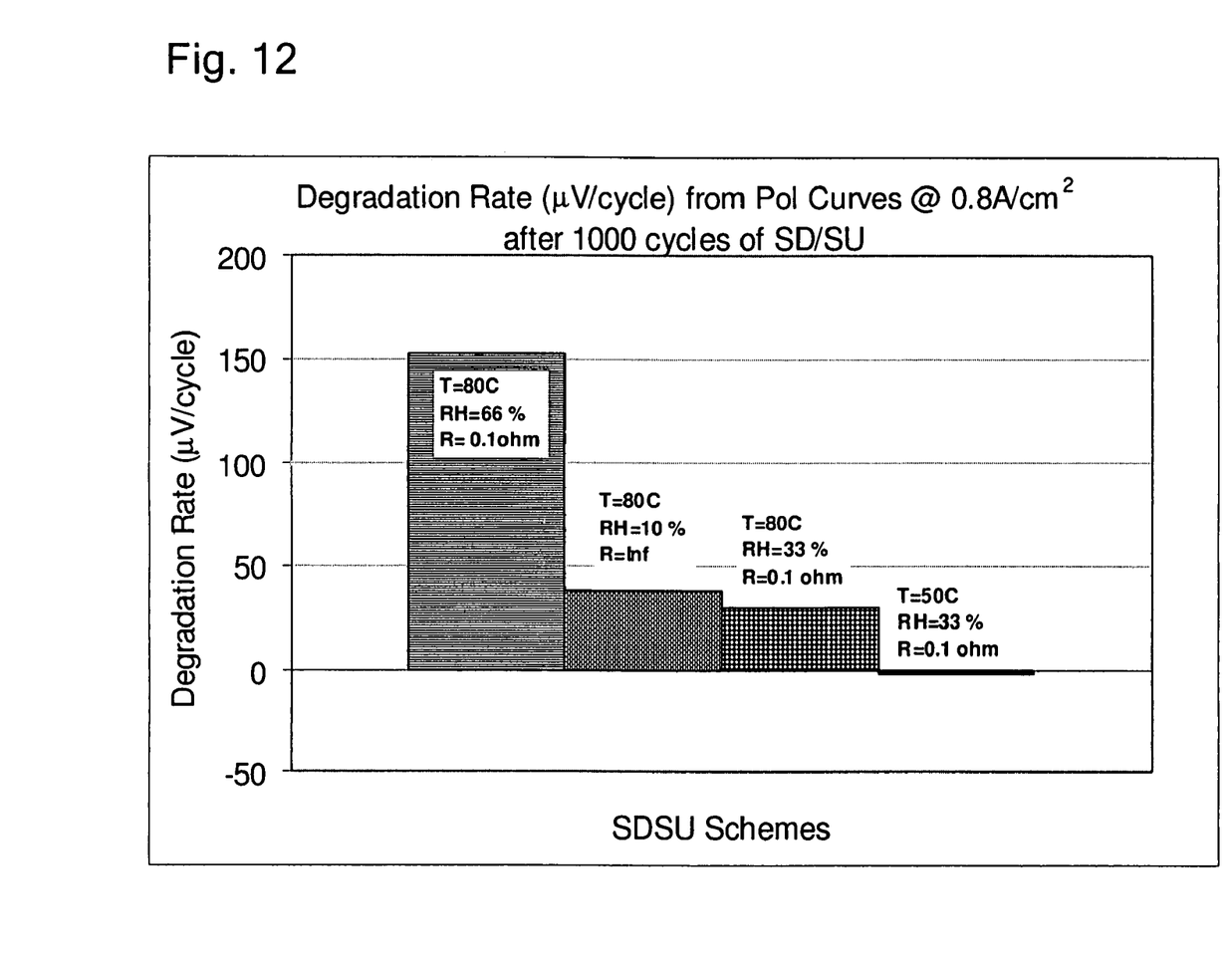

FIG. 11 illustrates comparative degradation rates at specific temperature and RH values in the cathode flow field 40 after about 200 fuel cell shut-down/start-up cycles. Specifically, degradation rates are presented in units of microvolts per cycle and are illustrated under four different temperature/RH operating parameters for the drying step illustrated in FIG. 5, above. Three of the operating parameters define a relatively low RH (10%-33%) while a fourth operating parameter is at about 100% RH. The difference between the respective degradation rates clearly illustrates that execution of the drying step illustrated in FIG. 5 dramatically mitigates the catalyst dissolution and corrosion in the membrane electrode assembly 20. Similar results would be expected if the drying step were executed elsewhere, as described above. FIG. 12 presents a similar illustration of the beneficial effects of the low RH drying step but also highlights particular advantages associated with operation at a relatively low temperature. Specifically, operation of the fuel cell at about 50° C. yields significantly better results than operation at 80° C. at similar RH. Of course, the illustrations of FIGS. 11 and 12 apply to specific operating conditions and fuel cell parameters and should not be interpreted to restrict the scope of the invention beyond that which is defined in the appended claims.

Figure 13:
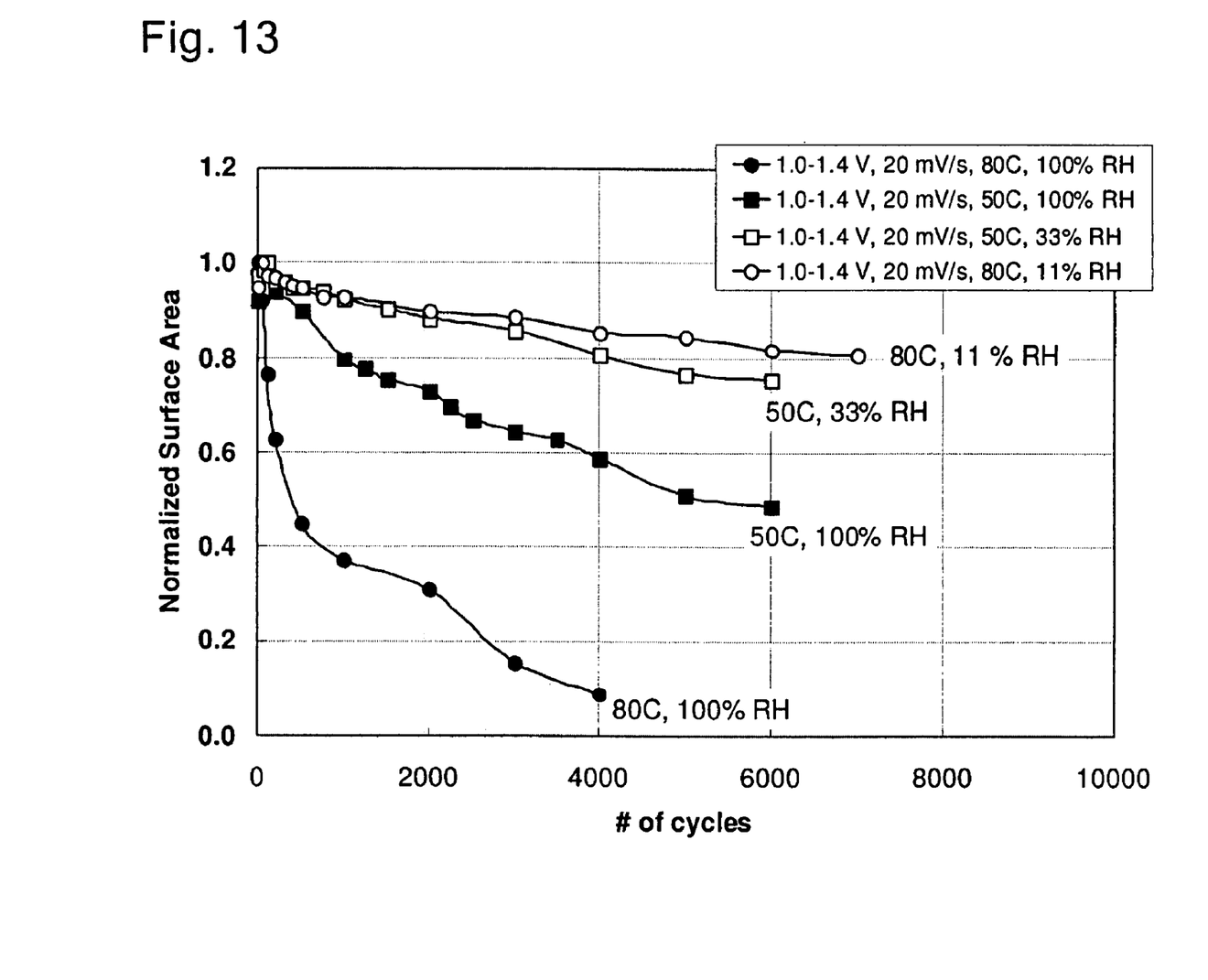
FIGS. 13 and 14 illustrate mitigation of dissolution and corrosion with direct reference to the electrode surface area.
Figure 14:
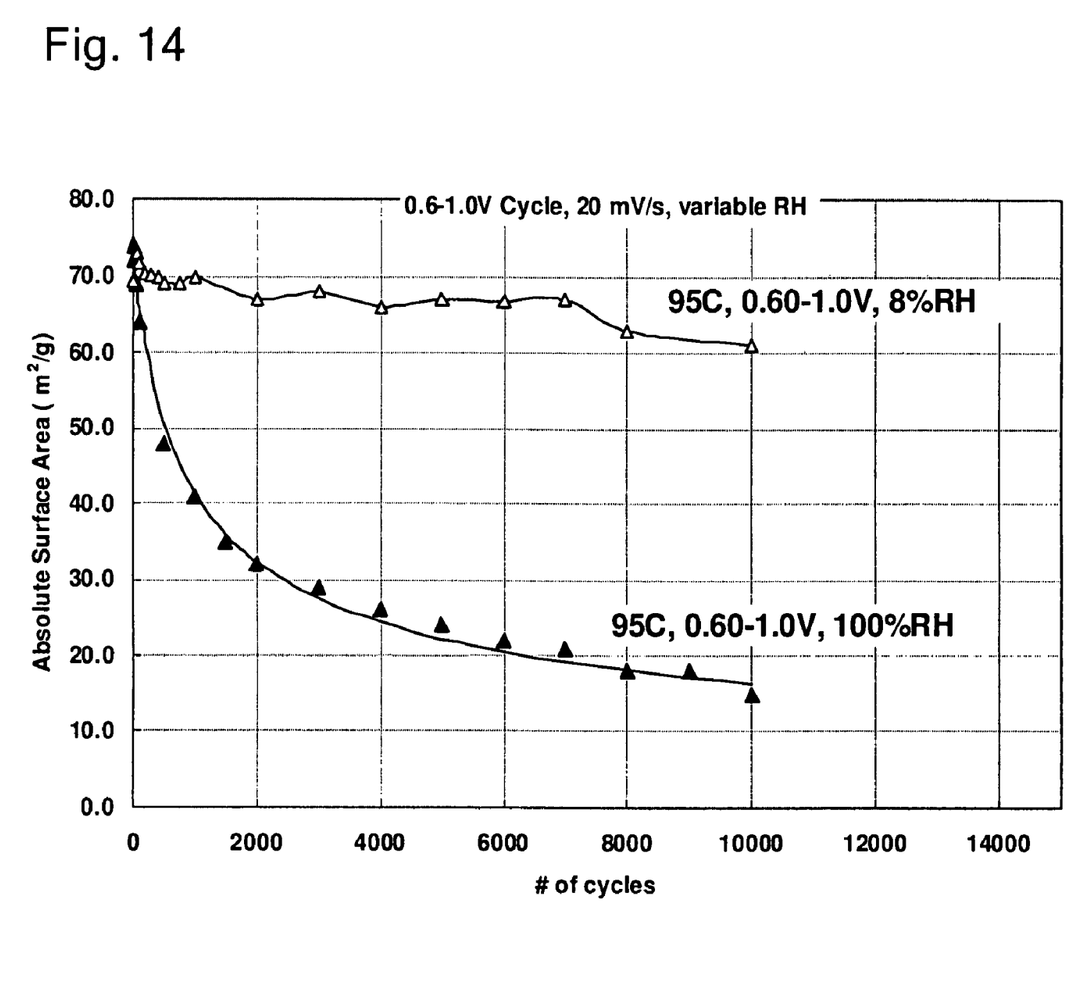

FIGS. 13 and 14 illustrate mitigation of catalyst dissolution and corrosion with direct reference to the electrode surface area of the membrane electrode assembly. Specifically, in FIGS. 13 and 14, surface area data is illustrated as a function of the number of shut-down/start-up cycles under specific voltage cycling conditions, with lower surface area values generally corresponding to increased dissolution and corrosion in the membrane electrode assembly. As can be seen in FIGS. 13 and 14, surface area degradation is relatively stable over a large number of cycles if low RH conditions are maintained during the drying step illustrated in FIG. 5, above. Similar results would be expected if the drying step were executed elsewhere, as described above. It should be appreciated that the illustrations of FIGS. 13 and 14 apply to specific operating conditions and fuel cell parameters and should not be interpreted to restrict the scope of the invention beyond that which is defined in the appended claims. Specifically, FIG. 13 simulates start-up/shut-down cycling without a shorting resistor 50 (see FIG. 3) where the voltage on the cathode would cycle between about 1.0 V and about 1.4 V. In contrast, FIG. 14 simulates start-up/shut-down cycling without a shorting resistor 50 (see FIG. 3) where the voltage on the cathode would cycle between about 0.6 V and about 1.0 V.

It is also noted that, despite the aforementioned advantages of membrane electrode assembly cooling, a dry gas driven through the cathode flow field at relatively high temperature will remove water from the membrane electrode assembly 20 at a higher rate because of its inherently high vapor capacity. Accordingly, an additional embodiment of the present invention contemplates the introduction of a drying gas initially at a first temperature characterized by a relatively high vapor capacity and subsequently at a second, cooler temperature sufficient to reduce the temperature of the membrane electrode assembly to a suitable level. For example, and not by way of limitation, the first, relatively high temperature can be between about 75° C. and about 90° C. and the second, relatively cool temperature can be below about 50° C.

It is noted that the energy required to drive the various gases through the anode and cathode flow fields during shut down and start up of the electrochemical conversion assembly of the present invention may originate from a variety of sources. For example, and not by way of limitation, the electrochemical conversion assembly 10 can be operated at a relatively low current density for a sufficient amount of time during the shut down sequence to provide energy sufficient to drive the substantially dry gas through the cathode flow field 40. Alternatively, an external battery may provide the requisite power, particularly where the conversion assembly 10 is utilized in a hybrid vehicle or other type of vehicle that is configured to maintain a charged vehicle battery.

As will be appreciated with those practicing the present invention, the concepts of the present invention are not limited to cell configurations including flowfield portions or membrane electrode assemblies of any specific nature. Indeed, flowfield portions suitable for use with the present invention merely need to be configured so as to enhance the delivery of reactants to the associated electrode assemblies and electrode assemblies suitable for use with the present invention merely need to be configured to produce electrical current upon contact with the reactants provided in the respective flow fields.

It is contemplated that the concepts of the present invention may be incorporated in the operational scheme of an electrochemical conversion assembly configured to at least partially provide a vehicle with motive power. Such vehicles typically have a fuel processing system or fuel source configured to supply the electrochemical conversion assembly with fuel.

Although the present invention is not limited to any specific reactant compositions, it will be appreciated by those practicing the present invention and generally familiar with fuel cell technology that the first reactant supply $R_1$ typically comprises oxygen and nitrogen while the second reactant supply $R_2$ comprises a hydrogenous gas like hydrogen, methane, reformed fuels, etc.

It is contemplated that the mitigation schemes of the present invention may be employed in combination with other schemes for mitigating losses associated with the cycling that occurs as the hydrogen front advances through the anode flow field. Examples of such mitigation schemes include, but are not limited to, anode and cathode recirculation schemes similar to those described in U.S. Pat. No. 6,514,635 B1 and U.S. P.G. Pub. Nos. 2002/0102443 A1 and 2002/0076583 A1, the disclosures of which are incorporated herein by reference.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

The invention claimed is:

1. A method of operating an electrochemical conversion assembly comprising a membrane electrode assembly, an anode flow field, and a cathode flow field, wherein:
   said membrane electrode assembly comprises a proton exchange membrane separating an anode and cathode of said assembly;
   said membrane electrode assembly comprises a catalyst supported by a relatively high surface area support material;
   said proton exchange membrane comprises a material characterized by enhanced proton conductivity under wet conditions; and
   said method comprises
      initiating a start up sequence,
      operating said electrochemical conversion assembly under wet conditions by driving a hydrogenous gas through said anode flow field and an oxygen-containing gas through said cathode flow field, and
      initiating a shut down sequence comprising driving a substantially dry oxygen-containing reactant gas through said cathode flow field for an amount of time sufficient to reduce the water content of said proton exchange membrane to a level sufficient to suppress catalyst dissolution and corrosion in said membrane electrode assembly, wherein said substantially dry oxygen-containing reactant gas is initially introduced at a first temperature characterized by a relatively high vapor capacity and is subsequently introduced at a second, cooler temperature sufficient to reduce the temperature of said membrane electrode assembly; interrupting a flow of said substantially dry oxygen-containing reactant gas when the water content of said proton exchange membrane is reduced; supplying said hydrogenous gas through said anode flow field after interrupting said flow of said substantially dry oxygen-containing reactant gas for a time sufficient to dilute an oxygen content of said cathode flow field; and introducing a substantially dry air purge into said anode flow field following dilution of said oxygen content.

2. A method as claimed in claim 1 wherein said substantially dry oxygen-containing reactant gas is driven through said cathode flow field during said shut down sequence for an amount of time sufficient to reduce the water content $\lambda$ of said proton exchange membrane to below about 5, where $\lambda$ corresponds to the molar ratio $H_2O/SO_3H$ in said membrane.

3. A method as claimed in claim 1 wherein said substantially dry oxygen-containing reactant gas is driven through said cathode flow field during said shut down sequence for an amount of time sufficient to reduce the water content $\lambda$ of said proton exchange membrane to below about 50% equivalent RH.

4. A method as claimed in claim 1 wherein electrical resistivity of said proton exchange membrane is monitored during said shut down sequence and supply of said substantially dry oxygen-containing reactant gas is interrupted when said resistivity reaches a predetermined value.

5. A method as claimed in claim 1 wherein the relative humidity of a cathode outlet gas is monitored during said shut down sequence and supply of said substantially dry oxygen-containing reactant gas is interrupted when said relative humidity reaches a predetermined value.

6. A method as claimed in claim 1 wherein said substantially dry oxygen-containing reactant gas is driven through said cathode flow field to initiate a transition of said conversion assembly from relatively high load operating conditions.

7. A method as claimed in claim 6 wherein said transition from said relatively high load operating conditions is accompanied by a substantial decrease in the supply of said hydrogenous gas through said anode flow field.

8. A method as claimed in claim 1 wherein:
said shut down sequence is further characterized by connecting a shorting resistor across said membrane electrode assembly; and.

9. A method as claimed in claim 8 wherein supply of said diluting hydrogenous gas is accompanied by application of an electrical short across said membrane electrode assembly to reduce the voltage of said cathode.

10. A method as claimed in claim 1 wherein:
said shut down sequence is further characterized by connecting a shorting resistor across said membrane electrode assembly introducing a substantially dry air in said cathode flow fields to achieve said reduction in said water content of said proton exchange membrane and simulate an equilibrium storage condition in said electrochemical conversion assembly.

11. A method as claimed in claim 1 wherein said start up sequence is characterized by driving a substantially dry gas through said cathode flow field following said shut down sequence and prior to driving said hydrogenous gas through said anode flow field.

12. A method as claimed in claim 1 wherein said substantially dry oxygen-containing reactant gas is characterized by a relative humidity of less than about 40%.

13. A method as claimed in claim 1 wherein said substantially dry oxygen-containing reactant gas is air or is characterized by a composition substantially equivalent to that of air.

14. A method as claimed in claim 1 wherein said electrochemical conversion assembly is operated at relatively low current density for a sufficient amount of time during said shut down sequence to provide energy sufficient to drive said substantially dry oxygen-containing reactant gas through said cathode flow field.

15. A method as claimed in claim 1 wherein said electrochemical conversion assembly is operated from an external power source to provide energy sufficient to drive said substantially dry oxygen-containing reactant gas through said cathode flow field.

16. A method as claimed in claim 1 wherein said second, cooler temperature comprises a temperature sufficient to suppress said catalyst dissolution and said corrosion in said membrane electrode assembly.

17. A method as claimed in claim 16 wherein said second, cooler temperature is affected through the operation of an assembly coolant pump, the introduction of a relatively cool gas into one or both of said flow fields, or combinations thereof.

18. A method as claimed in claim 16 wherein said cooling is sufficient to reduce the temperature of said membrane electrode assembly to below about 50° C.

19. A method as claimed in claim 16 wherein said cooling is sufficient to reduce the temperature of said membrane electrode assembly to about 25° C.

20. A method as claimed in claim 1 wherein said first temperature is between about 75° C. and about 90° C. and said second temperature is below about 50° C.

21. A method of operating an electrochemical conversion assembly comprising a membrane electrode assembly, an anode flow field, and a cathode flow field, wherein:
said membrane electrode assembly comprises a proton exchange membrane separating an anode and cathode of said assembly;
said proton exchange membrane comprises a material characterized by enhanced proton conductivity under wet conditions; and
said method comprises
initiating a start up sequence where a hydrogenous front is driven through said anode flow field,
operating said electrochemical conversion assembly under wet conditions by driving a hydrogenous gas through said anode flow field and an oxygen-containing gas through said cathode flow field, and
initiating a shut down sequence comprising driving a substantially dry oxygen-containing reactant gas through said cathode flow field for an amount of time sufficient to reduce the water content $\lambda$ of said proton exchange membrane to below about 5, where $\lambda$ corresponds to an $H_2O/SO_3H$ ratio in said membrane, wherein said substantially dry oxygen-containing reactant gas is initially introduced at a first temperature characterized by a relatively high vapor capacity and is subsequently introduced at a second, cooler temperature sufficient to reduce the temperature of said membrane electrode assembly; interrupting a flow of said substantially dry oxygen-containing reactant gas when the water content of said proton exchange membrane is reduced; supplying said hydrogenous gas through said anode flow field after interrupting said flow of said substantially dry oxygen-containing reactant gas for a time sufficient to dilute an oxygen content of said cathode flow field; and introducing a substantially dry air purge into said anode flow field following dilution of said oxygen content.

22. A method of operating an electrochemical conversion assembly comprising a membrane electrode assembly, an anode flow field, and a cathode flow field, wherein:
said membrane electrode assembly comprises a proton exchange membrane separating an anode and cathode of said assembly;
said membrane electrode assembly comprises a catalyst supported by a relatively high surface area support material;
said proton exchange membrane comprises a material characterized by enhanced proton conductivity under wet conditions; and
said method comprises
initiating a start up sequence,
operating said electrochemical conversion assembly under wet conditions by driving a hydrogenous gas through said anode flow field and an oxygen-containing gas through said cathode flow field, and
initiating a shut down sequence comprising driving a substantially dry oxygen-containing reactant gas through said anode flow field for an amount of time sufficient to reduce the water content of said proton exchange membrane to a level sufficient to suppress catalyst dissolution and corrosion in said membrane electrode assembly, wherein said substantially dry oxygen-containing reactant is initially introduced at a first temperature characterized by a relatively high vapor capacity and is subsequently introduced at a second, cooler temperature sufficient to reduce the temperature of said membrane electrode assembly; interrupting a flow of said substantially dry oxygen-containing reactant gas when the water content of said proton exchange membrane is reduced; supplying said hydrogenous gas through said anode flow field after interrupting said flow of said substantially dry oxygen-containing reactant gas for a time sufficient to dilute an oxygen content of said cathode flow field; and introducing a substantially dry air purge into said anode flow field following dilution of said oxygen content.

23. An electrochemical conversion assembly comprising a membrane electrode assembly, an anode flow field, a cathode flow field, a source of substantially dry gas, and an assembly controller, wherein:

said membrane electrode assembly comprises a proton exchange membrane separating an anode and cathode of said assembly;

said membrane electrode assembly comprises a catalyst supported by a relatively high surface area support material;

said proton exchange membrane comprises a material characterized by enhanced proton conductivity under wet conditions;

said support material and said electrode catalyst are subject to corrosion and catalyst dissolution as a result of relatively high voltages developed on said cathode of said membrane electrode assembly;

said electrochemical conversion assembly is optimized for operation under wet conditions with a hydrogenous gas driven through said anode flow field and an oxygen-containing gas driven through said cathode flow field;

said assembly controller is programmed to initiate a shut down sequence where a substantially dry oxygen-containing reactant gas from said dry gas source is driven through said cathode flow field for an amount of time sufficient to reduce the water content of said proton exchange membrane to a level sufficient to suppress said catalyst dissolution and said corrosion in said membrane electrode assembly, wherein said substantially dry oxygen-containing reactant gas is initially introduced at a first temperature characterized by a relatively high vapor capacity and is subsequently introduced at a second, cooler temperature sufficient to reduce the temperature of said membrane electrode assembly; a flow of said substantially dry oxygen-containing reactant gas is interrupted when the water content of said proton exchange membrane is reduced; said hydrogenous gas is supplied through said anode flow field after said flow of said substantially dry oxygen-containing reactant gas is interrupted for a time sufficient to dilute an oxygen content of said cathode flow field; and introducing a substantially dry air purge into said anode flow field following dilution of said oxygen content.

24. The method of claim 1 wherein said shut down sequence further comprises substantially decreasing a supply of said hydrogenous gas through said anode flow field while said substantially dry oxygen-containing reactant gas is flowing through said cathode flow field.

* * * * *